March 4, 1941.                P. V. H. WEEMS                2,233,440
CHART AND METHOD OF CONSTRUCTION THEREOF
Filed Feb. 23, 1939
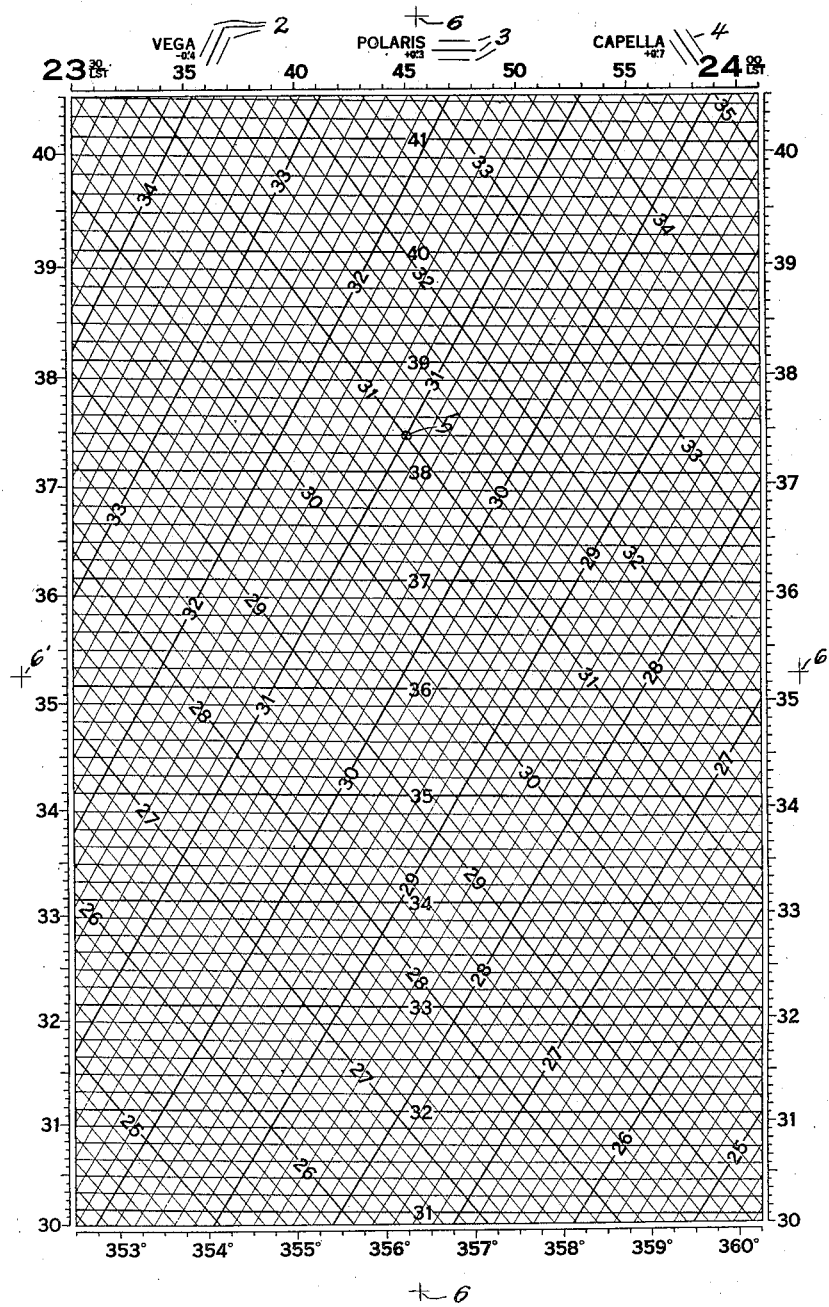
INVENTOR
*P.V. H. WEEMS*
BY
*Ransom K. Davis*
ATTORNEY Patented Mar. 4, 1941

2,233,440

UNITED STATES PATENT OFFICE 2,233,440

CHART AND METHOD OF CONSTRUCTION THEREOF

Philip V. H. Weems, United States Navy, Annapolis, Md.

Application February 23, 1939, Serial No. 257,896

7 Claims. (Cl. 101—426)

(Granted under the act of March 3, 1883, as amended April 30, 1928; 370 O. G. 757)

This invention relates to an improved chart, of the type disclosed by my application Serial No. 382,561, for "Method of and apparatus for navigation," filed July 31, 1929, and a method for the preparation and construction thereof. The chart disclosed in that application bears a plurality of sets of equal altitude curves of so-called fixed navigational stars. Each chart is prepared to cover a given navigable area. In preparing the chart two or more stars are selected which are so located with respect to the earth as to be clearly observable within the selected area and which are so relatively located that their circles of equal altitude for the selected area will cross at a proper angle to give an accurate "cut" in plotting a position. Each curve of equal altitudes found on the chart represents a segment of a circle and is the locus of all points within the selected area at which for a given instant of time the altitude of the star will have a particular value. These curves are drawn on a chart constructed in accordance with the Mercator projection. The chart, as disclosed in the above-mentioned application, furnishes a valuable means of ascertaining, in conjunction with other apparatus, the position of an observer on the earth's surface.

It is the object of this invention to provide a method of preparing and constructing such charts which will greatly reduce the cost of their production over prior methods.

It is a further object of this invention to provide an improved chart of this type which will reduce the time required by the observer to fix his position and will render the determination of the position less liable to error.

Attention is invited to my application Serial No. 319,860 for "Chart and method of construction thereof," filed February 20, 1940, which is a division of the present application.

The figure of the drawing is a plan view of a chart constructed in accordance with my invention.

The chart shown in the drawing shows the altitude curves of the three stars Vega, Polaris and Capella, the names of which are found near the top edge thereof. Adjacent each of said names is located a group of parallel line segments 2, 3 and 4, each group of which runs parallel to that set of lines in the body of the chart which pertains to that particular star.

Along the top of the chart beneath the names of the stars is located a scale of local sidereal time, running in this case from 23 hours 30 minutes to 24 hours. Along the bottom of the chart is located a corresponding scale with the local sidereal time indicated in degrees of arc rather than time. The provision of this latter scale constitutes a marked improvement in the chart over that disclosed in my above identified application, as will be later explained. Along each side of the chart runs a scale of latitude, the one shown here running from 30 to 40½ degrees of latitude.

The chart is intended for use with a sextant and a watch which keeps Greenwich sidereal time. In using the chart, the observer, who may be either in a surface craft or an aircraft, takes observations with a sextant, of the stars whose altitude curves are found on a particular chart, taking the observations with as little time interval as possible, and notes the time of each sight on his G. s. t. keeping watch or chronometer. He then enters the chart with the altitude thus obtained and marks the point where the altitude lines having those values cross. For example, if he found the altitude of Capella to be 31°, the altitude of Vega to be 31° and that of Polaris to be 38° 20', upon entering the chart he would find these altitude lines meeting at the point 5. Projecting point 5 horizontally to one of the latitude scales he would find the corresponding latitude to be 37° 28' and would immediately know that to be the latitude of his position. In order to find his position in longitude he would project point 5 vertically upward to the top l. s. t. scale, pick off his l. s. t. in units of time, subtract that value from G. s. t. of his sights and convert the difference to arc. This value will be the longitude of his position. However, this process, while short in itself, may be still further shortened and the chances for error greatly reduced by utilizing the scale of l. s. t. in units of arc which is found at the bottom of the chart. This scale is most conveniently used in conjunction with a watch which keeps G. s. t. in units of arc. In that case the observer merely runs down vertically from the point 5 of the bottom scale and picks off the corresponding l. s. t. in units of arc. Now by subtracting this value from the G. s. t. of the sights he obtains his longitude without the necessity of converting from time into arc.

The stars for which these charts are made up are the so-called "fixed" stars. Regardless of the popular conception of these stars as being fixed in position with respect to the earth, they nevertheless do have a definite annual movement both in right ascension and declination. The rate of this movement has, for all practical purposes, a constant yearly value.

In preparing these charts it has been found that the expense involved may be kept at a minimum and at the same time charts may be published yearly or as often as desired without any sacrifice of accuracy by employing the following method.

A set of master curves for each of about twenty of the best navigational stars is constructed on a large Mercator plotting sheet, the curves pertaining to each star being on a separate sheet. The master curves are calculated for the beginning of a decade, say for the year 1950. Now by lithography, or other means, transfer from the master curves for each star, appropriate sections of these curves which will exactly fit a page of the completed curves. The limits of latitude and local sidereal time covered by each page may be governed by the desired scale to which the curves are drawn and/or the accuracy desired.

In preparing charts, the curves from two or from three of the best positioned stars for each latitude and time are lithographed on the same chart. The curves for the respective stars are lithographed in distinctive colors. They are matched up on the sheet by the use of register marks such as are commonly used in making colored or over-print charts.

Such register marks are shown on the drawing at 6. Each lithographing plate is provided with identical register marks and registry of each set of curves on a finished chart is secured by adjusting the feed of the printing machine so that as each new set of curves is printed on the chart its marks will register with the corresponding marks of the set or sets of curves already on the chart.

The use of register marks to properly superimpose successive printings on a single sheet is not new. However, as will be described below, I employ such marks in a novel manner which results in an enormous saving in the time, labor and expense necessary to produce accurate star altitude charts at frequent intervals. Assume as above that the master curves have been calculated for the year 1950. The annual change in the positions of the stars relative to the earth being practically constant, its result will be to cause the set of altitude curves of a star to shift bodily a definite and equal amount each year. The shape of the curves will not be altered enough to cause appreciable error if ignored. In order to avoid computing the values for the curves for each year and the necessity for making a new set of master curves for each year, I compute the horizontal and vertical components of the total annual movement of the curves for each star and in printing a chart for a year other than that of the master curves, I offset the register marks for each star's curves an amount sufficient to cause the curves on the finished chart to assume their proper positions relative to the latitude and time scales. This may be done in two ways. The outline of the chart with the latitude and time scales and with register marks unaltered, is first printed on the sheet. Then the register marks on the zinc plates of the sections of star curves to be printed may be offset an amount equal to the necessary shift in position of the curves and each set of curves printed on the sheet so that all corresponding register marks on the finished chart are exactly superimposed. Alternatively, the outline and scales may be printed as before and the feed of the printing machine adjusted for each star's curves so that the register marks for each star will be offset the proper amount when that set of curves is printed.

A third alternative method of accomplishing the above is as follows: "Corner marks" indicating the corner of each page are drawn on the master curve sheets in such position as to locate the curves on the finished page in their proper position for the "epoch date" or datum year for which the curves are printed. The area indicated by the "corner marks" for the desired epoch is then transferred to the printed page by any desired method. A change in the "epoch date" of the curves is thus accomplished merely by placing other appropriately positioned "corner marks" on the master curve sheets and proceeding as before.

In order to avoid the necessity of printing new charts every year the correction for the yearly shift of altitude for each star may be printed on the chart.

This correction is applied to the sextant reading of the observer. The sign shown with the correction indicates its application to a sextant reading taken at a date later than the epoch date for which the printed curves have been positioned. For an earlier date than the epoch date for which the curves have been positioned, the sign of the correction is reversed in applying it to the sextant reading. Thus a set of curves may be used for any number of years either before or after the epoch date, by applying the correction for the proper number of years that the observation was made before or after the epoch date for which the curves were positioned in printing. For example, with the curves positioned for an epoch date of 1950 and an annual altitude correction, of a given star, of plus 0.5 minute, an observation of that star made in 1955 would be corrected by 5 times 0.5 minute or a total of plus 2.5 minutes, but for an observation of that same star made in the year 1945 (earlier than the "epoch date") the sign of the correction would be reversed and would become 5 times minus 0.5 minute or a total correction of minus 2.5 minutes. This feature is shown in the drawing, the amount of the annual correction being shown directly under the name of the star. That for Vega is shown as $-0'.4$.

In order to reduce to a minimum the work of an observer in fixing his position and at the same time eliminate as far as possible all chances of error in using the charts, all corrections which are functions of the altitude are incorporated in the curves. For example, each altitude curve is computed to include the value of the refraction correction for that altitude. Thus the observer merely picks out the value of his observed altitude in the chart without considering refraction.

The use of the above described method of constructing charts effects a great reduction in the cost of their preparation, and the resulting charts as described, add greatly to the rapidity and accuracy of determining an observer's position, being especially valuable where the observer is in a high speed vehicle such as an aircraft, in which case the determination of a position, to be of value, must be accomplished with the utmost speed.

The invention described herein may be manufactured and/or used by or for the Government of the United States of America for governmental purposes without the payment of any royalties thereon or therefor.

I claim:

1. The method of preparing an annual series of charts carrying reference indicia and at least one set of lines related thereto, which set of lines undergoes an annual bodily shift of position with respect to said reference indicia, comprising the steps of preparing one printing plate carrying said reference indicia, preparing a second printing plate carrying said set of lines calculated for a datum year of said series and so located thereon that a successive printing from said plates in registry on a single sheet of paper will cause said set of lines to be correctly positioned with respect to said reference indicia for the datum year of the series, and when printing for a year other than the datum, shifting the printing relationship of said second printing plate with respect to the sheet an amount equal to the amount of the shift of said set of lines for the period of time from said datum year to the selected year.

2. The method of printing a series of charts carrying at least two sets of related reference indicia, which sets shift their relative positions through said series of charts, which method comprises preparing a master plate for each of said sets of indicia calculated for a datum point of said series and with said sets so located on said plates that a successive transfer of said sets of indicia from said plates to a single sheet of paper in registry thereon will result in the said sets of indicia being located on said sheet in correct positional relationship for the datum point of the series, and when preparing a chart for any other selected point in the series shifting the printing relationship of one of said plates with respect to said sheet an amount equal to the calculated amount of relative shift of position of the sets of indicia for the portion of the series comprised between the datum point and the selected point.

3. The method of preparing an annual series of charts carrying reference indicia and at least one set of lines related thereto, which set of lines undergoes an annual bodily shift of position with respect to said reference indicia, comprising the steps of preparing a master drawing of said set of lines for a selected datum year of said series, lithographing said master drawing on to a first printing plate, lithographing on to a second printing plate the reference indicia of one of said charts, providing each of said printing plates with corresponding register marks, printing said outline and reference indicia from said printing plate, and printing said set of lines from said first printing plate on said reference indicia with the register marks from said first printing plate located a distance from the register marks of said second printing plate equal to the shift in position of said set of lines for the period of time between a selected year of the series and the datum year.

4. The method of shifting the positional relationship of a plurality of sets of printed interrelated reference indicia on a sheet of paper, which sets are normally printed thereon by successive printings in registry from master printing plates each of which carries one of said sets of indicia and each of which is provided with register marks corresponding to those of every other plate, which method comprises printing from one of said plates on to said sheet, then printing in succession from each of said other plates on to said sheet and in so doing shifting the registry of each of said other plates with the sheet with respect to the registry of said one of said plates with the sheet, by an amount equal to the desired shift in positional relationship between the set of indicia carried thereby and that first printed.

5. The method of preparing an annual series of charts carrying reference indicia and at least one set of lines related thereto, which set of lines undergoes an annual bodily shift of position with respect to said reference indicia, comprising the steps of preparing a master drawing of said set of lines for a selected datum year of said series, lithographing said master drawing on to a first printing plate, lithographing on to a second printing plate the reference indicia of one of said charts, providing said second printing plate with register marks, offsetting said latter register marks for any selected year of the series a distance equal to the amount of the shift in position of said set of lines over the period of time between said selected year and said datum year, and from said printing plates printing said set of lines over said reference indicia with the corresponding register marks exactly superimposed.

6. The method of preparing an annual series of charts carrying reference indicia and at least one set of lines related thereto, which set of lines undergoes an annual bodily shift of position with respect to said reference indicia, comprising the steps of preparing a master drawing of said set of lines for a selected datum year of said series, lithographing said master set of lines on to a first printing plate, lithographing on to a second printing plate the reference indicia of one of said charts, providing each of said printing plates with corresponding register marks so located that the exact superposing of said corresponding register marks when printing successively from said plates will cause said set of lines to be correctly located with respect to said reference indicia when making charts for the datum year, and controlling the registry of said plates by means of said register marks when making charts for a year other than the datum so that the said set of lines will be shifted in position with respect to said reference indicia an amount equal to the shift in the lines over the period of time from the datum year to the selected year.

7. The method of preparing an annual series of charts carrying reference indicia and at least one set of lines related thereto, which set of lines undergoes an annual bodily shift of position with respect to said reference indicia, comprising the steps of preparing a chart outline with said reference indicia positioned relative thereto, transferring said outline and indicia to a sheet which is to be a finished chart, preparing a master drawing of said set of lines computed for a datum year of said series and bearing corner marks, which corner marks match the corners of said outline, and which marks are so located as to correctly position said set of lines with respect to said outline for said datum year, transferring said set of lines on to said sheet with said corner marks in registry, and when preparing a chart for a year of the series other than the datum year, shifting said corner marks an amount equal to the bodily shift of said lines for the period of time comprised between said year and said datum year, and transferring said lines to said sheet in accordance with said shifted corner marks.

PHILIP V. H. WEEMS.